United States Patent
Nishimura et al.

(10) Patent No.: US 11,649,387 B2
(45) Date of Patent: May 16, 2023

(54) GAS SEAL MEMBER FOR HIGH-PRESSURE HYDROGEN DEVICE, AND HIGH-PRESSURE HYDROGEN DEVICE

(71) Applicants: KYUSHU UNIVERSITY, NATIONAL UNIVERSITY CORPORATION, Fukuoka (JP); ZEON CORPORATION, Tokyo (JP)

(72) Inventors: Shin Nishimura, Fukuoka (JP); Yoshihisa Takeyama, Tokyo (JP)

(73) Assignees: KYUSHU UNIVERSITY, NATIONAL UNIVERSITY CORPORATION, Fukuoka (JP); ZEON CORPORATION, Chiyoda-ku Tokyo (JP)

( * ) Notice: Subject to any disclaimer, the term of this patent is extended or adjusted under 35 U.S.C. 154(b) by 896 days.

(21) Appl. No.: 16/482,806

(22) PCT Filed: Feb. 13, 2018

(86) PCT No.: PCT/JP2018/004893
§ 371 (c)(1),
(2) Date: Aug. 1, 2019

(87) PCT Pub. No.: WO2018/151099
PCT Pub. Date: Aug. 23, 2018

(65) Prior Publication Data
US 2020/0224070 A1 Jul. 16, 2020

(30) Foreign Application Priority Data
Feb. 14, 2017 (JP) .............................. JP2017-025462

(51) Int. Cl.
*F16J 15/10* (2006.01)
*C09K 3/10* (2006.01)

(52) U.S. Cl.
CPC ........... *C09K 3/1028* (2013.01); *F16J 15/102* (2013.01); *C09K 2003/1053* (2013.01)

(58) Field of Classification Search
CPC ............ C09K 3/1028; C09K 2003/1053; F16J 15/102; F16J 15/02; F16J 15/022; F16J 15/06; F16J 15/10
See application file for complete search history.

(56) References Cited

U.S. PATENT DOCUMENTS

2008/0318049 A1 12/2008 Hata et al.
2014/0154454 A1 6/2014 Ueki et al.
(Continued)

FOREIGN PATENT DOCUMENTS

JP 2014109020 A 6/2014
JP 2015206002 A 11/2015
(Continued)

OTHER PUBLICATIONS

Sep. 8, 2021, Communication pursuant to Article 94(3) EPC issued by the European Patent Office in the corresponding European Patent Application No. 18753896.2.
(Continued)

*Primary Examiner* — Gilbert Y Lee
(74) *Attorney, Agent, or Firm* — Kenja IP Law PC (57) ABSTRACT

Disclosed is a gas seal member for high-pressure hydrogen device with sufficiently reduced occurrence of both swelling destruction and blister destruction. The gas seal member is formed of a cross-linked product of an elastomer composition which comprises an elastomer and fibrous carbon nanostructures, wherein a hydrogen diffusion coefficient D1 of a cross-linked product of an elastomer component including the elastomer and a hydrogen diffusion coefficient D2 of the cross-linked product of the elastomer composition satisfy the relationship $0.7 < D2/D1 < 1.0$.

7 Claims, 1 Drawing Sheet

(56) References Cited

U.S. PATENT DOCUMENTS

2014/0353556 A1* 12/2014 Shigeta ................ C01B 32/162
 252/511
2016/0280895 A1  9/2016 Francois et al.
2018/0362734 A1* 12/2018 Takeyama ............ C09K 3/1009

FOREIGN PATENT DOCUMENTS

| JP | 2016090050 A | 5/2016 | |
|---|---|---|---|
| WO | 2006011655 A1 | 2/2006 | |
| WO | 2016208203 A1 | 12/2016 | |
| WO | WO-2016208203 A1 * | 12/2016 | ............. C08K 3/041 |

OTHER PUBLICATIONS

Aug. 20, 2019, International Preliminary Report on Patentability issued in the International Patent Application No. PCT/JP2018/004893.

Oct. 22, 2020, the Extended European Search Report issued by the European Patent Office in the corresponding European Patent No. 18753896.2.

Mar. 13, 2018, International Search Report issued in the International Patent Application No. PCT/JP2018/004893.

Ryo Takahashi et al., Fluoroelastomer for O-rings Sealing of High-temperature and High-pressure Hydrogen, Journal of Japan Rubber Association, 2016, pp. 302-306, vol. 89, No. 10.

* cited by examiner

GAS SEAL MEMBER FOR HIGH-PRESSURE HYDROGEN DEVICE, AND HIGH-PRESSURE HYDROGEN DEVICE

TECHNICAL FIELD

The present disclosure relates to gas seal members for high-pressure hydrogen device, and high-pressure hydrogen devices.

BACKGROUND

Gas seal members such as packings and gaskets have heretofore been used as members for preventing gas leakage. Such gas seal members are used for example in hydrogen stations for fuel cell vehicles (see, e.g., PTL 1 and PTL 2). Because gas seal members are exposed to stringent conditions such as high-temperature environments in such applications, they are required to have higher durability in high-temperature environments.

PTL 3, for example, provides a gas seal member which may endure long-time use even under stringent conditions such as in high-temperature environments. The gas seal member is formed by cross-linking an elastomer composition which comprises a three-component fluoroelastomer blended with a specific proportion of multi-walled carbon nanotubes having a specific average diameter.

CITATION LIST

Patent Literature

PTL 1: JP2016-090050A
PTL 2: JP2015-206002A
PTL 3: JP2014-109020A

SUMMARY

Technical Problem

Gas seal members used in high-pressure hydrogen devices such as hydrogen stations for fuel cell vehicles are required to have durability in high-pressure hydrogen environments of as high as, for example, 35 MPa or more and 105 MPa or less. Because gas seal members to be brought in contact with such high-pressure hydrogen may experience swelling destruction and blister destruction, it has been required to reduce the occurrence of such modes of destruction.

"Swelling destruction" as used herein refers to the destruction of a gas seal member which is caused by the gas seal member being overflowed from a predetermined installment position (e.g., groove for installment) by contact with high-pressure hydrogen into a gap or other space around the installment position. "Blister destruction" as used herein refers to the destruction of a gas seal member which is caused by the hydrogen gas, penetrated through the gas seal member when the gas seal member has been brought into contact with high-pressure hydrogen, expanding inside the gas seal member upon, for example, rapid decompression and rupturing the gas seal member.

While the gas seal member disclosed in PTL 3 has excellent durability in high-temperature environments, the durability under high-pressure hydrogen conditions at the time when the gas seal member is applied to a high-pressure hydrogen device is not sufficient. Thus, the occurrence of swelling destruction and blister destruction of the gas seal member cannot be sufficiently reduced.

An object of the present disclosure is therefore to provide a gas seal member for high-pressure hydrogen device with sufficiently reduced occurrence of both swelling destruction and blister destruction.

Another object of the present disclosure is to provide a high-pressure hydrogen device in which the occurrence of swelling destruction and blister destruction of a gas seal member is sufficiently reduced.

Solution to Problem

The inventor made extensive studies to achieve the foregoing objects and established that the occurrence of both swelling destruction and blister destruction of a gas seal member for high-pressure hydrogen device can be sufficiently reduced when the gas seal member is formed of a cross-linked product of an elastomer composition which comprises an elastomer and fibrous carbon nanostructures wherein a hydrogen diffusion coefficient $D1$ of a cross-linked product of an elastomer component including the elastomer and a hydrogen diffusion coefficient $D2$ of the cross-linked product of the elastomer composition satisfy the relationship $0.7 < D2/D1 < 1.0$. The inventor thus completed the present disclosure.

That is, the present disclosure aims to advantageously solve the foregoing problem and a gas seal member for high-pressure hydrogen device (hereinafter also simply "gas seal member") of the present disclosure is formed of a cross-linked product of an elastomer composition which comprises an elastomer and fibrous carbon nanostructures, wherein a hydrogen diffusion coefficient $D1$ of a cross-linked product of an elastomer component including the elastomer and a hydrogen diffusion coefficient $D2$ of the cross-linked product of the elastomer composition satisfy the relationship $0.7 < D2/D1 < 1.0$. With such a gas seal member wherein a hydrogen diffusion coefficient $D1$ of a cross-linked product of an elastomer component including an elastomer and a hydrogen diffusion coefficient $D2$ of a cross-linked product of an elastomer composition satisfy the relationship $0.7 < D2/D1 < 1.0$, the occurrence of both swelling destruction and blister destruction can be sufficiently reduced.

In the gas seal member of the present disclosure, the elastomer may be nitrile rubber, hydrogenated nitrile rubber, or fluororubber. When, for example, fluororubber is used as the elastomer, heat resistance etc. can be improved.

It is preferred that the fibrous carbon nanostructures have an average diameter of 1 nm or more and 60 nm or less. The use of fibrous carbon nanostructures having an average diameter of 1 nm or more and 60 nm or less can further reduce the occurrence of swelling destruction and blister destruction.

The "average diameter (Av) of fibrous carbon nanostructures" can be obtained by measuring diameters (outer diameters) of 100 randomly-selected fibrous carbon nanostructures using a transmission electron microscope.

It is also preferable that the fibrous carbon nanostructures include single-walled carbon nanotubes. When the fibrous carbon nanostructures include single-walled carbon nanotubes, it is possible to further reduce the occurrence of swelling destruction and blister destruction.

Further, it is preferred that the elastomer composition comprises 3 parts by mass or more and 15 parts by mass or less of the fibrous carbon nanostructures including single-walled carbon nanotubes per 100 parts by mass of the elastomer. When the elastomer composition comprises 3 parts by mass or more and 15 parts by mass or less of the fibrous carbon nanostructures including single-walled carbon nanotubes per 100 parts by mass of the elastomer, it is possible to certainly reduce the occurrence of swelling destruction and blister destruction.

The gas seal member of the present disclosure may be used in a state of being in contact with high-pressure hydrogen of 35 MPa or more and 105 MPa or less.

The high-pressure hydrogen device of the present disclosure may comprise a container filled with high-pressure hydrogen of 35 MPa or more and 105 MPa or less, and a gas seal member which is in contact with the high-pressure hydrogen in the container. With the use of the gas seal member described above, the high-pressure hydrogen device can exhibit sufficient durability even when the gas seal member is in contact with high-pressure hydrogen of 35 MPa or more and 105 MPa or less.

The pressure of the high-pressure hydrogen can be, for example, 60 MPa or more or 70 MPa or more. The pressure of the high-pressure hydrogen can be, for example, 100 MPa or less or 95 MPa or less.

Advantageous Effect

According to the present disclosure, it is possible to provide a gas seal member for high-pressure hydrogen device with sufficiently reduced occurrence of both swelling destruction and blister destruction.

According to the present disclosure, it is also possible to provide a high-pressure hydrogen device in which the occurrence of swelling destruction and blister destruction of a gas seal member is sufficiently reduced.

BRIEF DESCRIPTION OF THE DRAWINGS

In the accompanying drawing.

DETAILED DESCRIPTION

Hereinafter, embodiments of the present disclosure will be described in detail.

The gas seal member for high-pressure hydrogen device according to the present disclosure can be used as a member for preventing gas leakage in, for example, a hydrogen station for fuel cell vehicles. In particular, the gas seal member according to the present disclosure can be suitably used in a high-pressure hydrogen device where the gas seal member is brought in contact with high-pressure hydrogen. One example of such a high-pressure hydrogen device comprises a container filled with high-pressure hydrogen, and a gas seal member to be brought in contact with the high-pressure hydrogen in the container for preventing leakage of the high-pressure hydrogen. The term "high-pressure hydrogen device" as used herein refers to a device which handles high-pressure hydrogen of, for example, 35 MPa or more and 105 MPa or less. Specific examples are devices used for hydrogen stations, such as a hydrogen production device (e.g., a hydrogen production device 111 in FIG. 1 described later), a hydrogen gas compressor (e.g., a hydrogen gas compressor (booster) 112 in FIG. 1 described later), a gas accumulator (e.g., a gas accumulator (pressure accumulator) 113 in FIG. 1 described later), a dispenser (e.g., a dispenser 114 in FIG. 1 described later), and a fuel cell mounted on a vehicle (e.g., a vehicle (fuel cell vehicle) 120 in FIG. 1 described later).

(Gas Seal Member for High-Pressure Hydrogen Device)

The gas seal member for high-pressure hydrogen device of the present disclosure can be obtained by forming an elastomer composition into a desired shape. Specifically, the gas seal member can be formed for example by charging the elastomer composition into a mold and cross-linking the composition. The gas seal member formed using the elastomer composition comprises components derived from the components contained in the elastomer composition in the same ratios as the components contained in the elastomer composition. That is, for example, when the elastomer composition comprises a cross-linking agent, the resulting gas seal member comprises a cross-linked elastomer component and fibrous carbon nanostructures, and optionally further comprises reinforcing materials and other like additives.

The gas seal member can be of any shape depending on the application. For example, the gas seal member may be an annular gas seal member (O-ring) or a hollow disc-shaped gas seal member.

The gas seal member shows sufficiently reduced occurrence of both swelling destruction and blister destruction.

The gas seal member is formed of a cross-linked product obtained by cross-linking an elastomer composition described later. The "tensile strength" and "elongation at break" of the cross-linked product can be measured in accordance with JIS K6251.

The "dissolved hydrogen amount" of the cross-linked product can be measured by measuring changes in released hydrogen amount with time for a hydrogen-exposed specimen using a temperature-programmed desorption gas analyzer.

The "volume swelling degree" of the cross-linked product can be measured using a two-dimensional size meter based on the volume change ratio before and after hydrogen exposure.

(Elastomer Composition)

The elastomer composition used to form the gas seal member according to the present disclosure comprises an elastomer and fibrous carbon nanostructures, and optionally further comprises reinforcing materials such as silica, cross-linking agents, antioxidants, and/or other like additives. In the elastomer composition used to form the gas seal member according to the present disclosure, a hydrogen diffusion coefficient D1 of a cross-linked product of an elastomer component including an elastomer (i.e., a cross-linked product of the elastomer composition exclusive of the fibrous carbon nanostructures and filler (e.g., silica, carbon black)) and a hydrogen diffusion coefficient D2 of a cross-linked product of the elastomer composition satisfy the relationship $0.7 < D2/D1 < 1.0$.

The hydrogen diffusion coefficient of each cross-linked product is a measure of easiness with which hydrogen diffuses through the cross-linked product. Thus, the larger the hydrogen diffusion coefficient of the cross-linked product constituting the gas seal member, the more easily the hydrogen retained inside the gas seal member escapes to the outside upon, for example, rapid decompression and hence the less it is likely that blister destruction occurs. On the other, when the cross-linked product constituting the gas seal member comprises a reinforcing material such as carbon black, swelling destruction generally is less likely to occur due to improved tensile strength of the cross-linked product. In this case, however, the hydrogen diffusion coefficient of the cross-linked product decreases (i.e., blister destruction easily occurs) as a result of hydrogen being adsorbed on the reinforcing material such as carbon black and/or the migration of the hydrogen within the cross-linked product being inhibited.

In the present disclosure, it was discovered that fibrous carbon nanostructures may serve as a reinforcing material that is less likely to decrease the hydrogen diffusion coefficient, and by including the fibrous carbon nanostructures and adjusting D2/D1 to fall within the range described above, it is made possible to well reduce the occurrence of both swelling destruction and blister destruction in the gas seal member.

The ratio of the hydrogen diffusion coefficient D2 of the cross-linked product of the elastomer composition to the hydrogen diffusion coefficient D1 of the cross-linked product of the elastomer component including the elastomer (D2/D1) is preferably 0.75 or more, more preferably 0.80 or more, and particularly preferably 0.83 or more, but is preferably 0.95 or less, more preferably 0.90 or less, and particularly preferably 0.87 or less.

When D2/D1 is 0.75 or more, it is possible to ensure hydrogen diffusion, whereby the occurrence of both swelling destruction and blister destruction can be further reduced. When D2/D1 is 0.95 or less, it is possible to ensure strength, whereby the occurrence of both swelling destruction and blister destruction can be further reduced.

<Elastomer>

The elastomer in the elastomer composition is not particularly limited, and any known elastomers can be used which are used for forming gas seal members. Specific examples of usable elastomers include natural rubber, butadiene rubber, styrene butadiene rubber, isoprene rubber, nitrile rubber (NBR), hydrogenated nitrile rubber (H-NBR), fluororubber, chloroprene rubber, ethylene propylene rubber, halogenated butyl rubber, polyisobutylene rubber, silicone rubber, and ethylene-propylene-diene rubber (EPDM). These elastomers may be used alone or in combination.

Preferred elastomers are rubbers having a Mooney viscosity ($ML_{1+4}$, 100° C.) of 20 or more and 150 or less (e.g., hydrogenated nitrile rubber, nitrile rubber) and fluororubber having a Mooney viscosity ($ML_{1+10}$, 121° C.) of 20 or more and 150 or less. In the present disclosure, Mooney viscosity can be measured in accordance with JIS K6300.

A preferred elastomer to be included in the gas seal member used for a hydrogen gas compressor (booster) (e.g., −20° C. to 180° C., 95 MPa) is fluororubber (e.g., FKM); preferred elastomers to be included in the gas seal member used for a gas accumulator (pressure accumulator) (e.g., −20° C. to 50° C., 95 MPa) are nitrile rubber (NBR) and hydrogenated nitrile rubber (H-NBR); and a preferred elastomer to be included in the gas seal member used for a dispenser (e.g., −40° C. to 50° C., 82 MPa) is ethylene-propylene-diene rubber (EPDM).

<Fibrous Carbon Nanostructures>

Examples of fibrous carbon nanostructures include cylindrical carbon nanostructures such as carbon nanotubes (CNTs) and non-cylindrical carbon nanostructures such as those formed of a network of 6-membered carbon rings in flattened cylindrical shape.

With fibrous carbon nanostructures included in the elastomer composition, it is possible to ensure strength without causing a significant decrease in the hydrogen diffusion coefficient D2, so that the occurrence of swelling destruction and blister destruction can be reduced.

How the inclusion of fibrous carbon nanostructures in the elastomer composition ensures strength without causing a significant decrease in the hydrogen diffusion coefficient D2 to reduce the occurrence of swelling destruction and blister destruction is not clear. A possible mechanism would be as follows. Fibrous carbon nanostructures, even in small amounts, can provide a higher reinforcing effect than carbon black and other like materials. Further, fibrous carbon nanostructures are less likely to allow hydrogen to dissolve (or absorb) inside than carbon black and other like materials and therefore do not easily decrease the hydrogen diffusion coefficient. For these reasons, a gas seal member formed using fibrous carbon nanostructures can keep a high hydrogen diffusion coefficient while being given a high reinforcing effect. It is thus deduced that the hydrogen that penetrated through the gas seal member can easily escape from the gas seal member upon, for example, rapid decompression, thus reducing the occurrence of blister destruction. It is also deduced that because fibrous carbon nanostructures have a higher reinforcing effect than carbon black and other like materials, a gas seal member formed using fibrous carbon nanostructures is less likely to deform (i.e., shows low volume expansion ratio) even when brought in contact with high-pressure hydrogen and therefore is less likely to experience swelling destruction.

The amount of the fibrous carbon nanostructures in the elastomer composition used to form the gas seal member is preferably 0.1 parts by mass or more, more preferably 1 part by mass or more, even more preferably 2 parts by mass or more, still more preferably 3 parts by mass or more, still more preferably 4 parts by mass or more, particularly preferably 8 parts by mass or more, and most preferably 10 parts by mass or more, per 100 parts by mass of the elastomer. If the amount of the fibrous carbon nanostructures is less than 0.1 parts by mass per 100 parts by mass of the elastomer, it may result in failure to ensure the strength of the gas seal member formed using the elastomer composition and therefore the occurrence of swelling destruction and blister destruction may not be sufficiently reduced.

The amount of the fibrous carbon nanostructures in the elastomer composition used to form the gas seal member is preferably 50 parts by mass or less, more preferably 45 parts by mass or less, even more preferably 40 parts by mass or less, particularly preferably 35 parts by mass or less, and most preferably 30 parts by mass or less, per 100 parts by mass of the elastomer. If the amount of the fibrous carbon nanostructures exceeds 50 parts by mass per 100 parts by mass of the elastomer, the hydrogen that penetrated through the gas seal member formed using the elastomer composition becomes less likely to escape from the gas seal member upon, for example, rapid decompression, so that the occurrence of blister destruction may not be sufficiently reduced.

The fibrous carbon nanostructures are not particularly limited and may be those consisting only of single-walled carbon nanotubes (CNTs), those consisting only of multi-walled carbon nanotubes (multi-walled CNTs), a mixture of singled-walled CNTs and multi-walled CNTs, or a mixture of CNTs and fibrous carbon nanostructures other than CNTs.

Singled-walled CNTs are preferred in that they are less likely to allow hydrogen to adsorb thereon and thus offer a higher reinforcing effect than multi-walled CNTs.

From the viewpoint of further reducing the occurrence of swelling destruction and blister destruction of the gas seal member formed using the elastomer composition, per 100 fibrous carbon nanostructures, it is preferred that 50 or more, more preferably 70 or more, even more preferably 90 or more, and particularly 100 fibrous carbon nanostructures are single-walled CNTs.

In the elastomer composition used to form the gas seal member of the present disclosure, it is preferred that the fibrous carbon nanostructures are fibrous carbon nanostructures including single-walled CNTs. The use of such fibrous carbon nanostructures including single-walled CNTs makes it possible to further reduce the occurrence of swelling destruction and blister destruction.

How the fibrous carbon nanostructures including single-walled CNTs can further reduce the occurrence of swelling destruction and blister destruction is not clear. A possible mechanism is as follows. Because single-walled CNTs can more easily allow hydrogen to pass through than multi-walled CNTs and thus the hydrogen penetrated through a gas seal member formed using single-walled CNTs can easily escape from the gas seal member upon, for example, rapid decompression, it is deduced that the occurrence of blister destruction can be further reduced. Further, because single-walled CNTs have a higher reinforcing effect than multi-walled CNTs, it is deduced that the gas seal member formed using single-walled CNTs is less likely to deform even when brought in contact with high-pressure hydrogen and therefore the occurrence of swelling destruction can be further reduced.

When fibrous carbon nanostructures including single-walled CNTs are used, the amount of the fibrous carbon nanostructures including single-walled CNTs in the elastomer composition used to form the gas seal member is preferably 0.5 parts by mass or more, more preferably 1 part by mass or more, even more preferably 2 parts by mass or more, and particularly preferably 3 parts by mass or more, per 100 parts by mass of the elastomer. If the amount of the fibrous carbon nanostructures including single-walled CNTs in the elastomer composition is less than 0.5 parts by mass per 100 parts by mass of the elastomer, it may result in failure to ensure the strength of the gas seal member formed using the elastomer composition and therefore the occurrence of swelling destruction and blister destruction may not be sufficiently reduced.

The amount of the fibrous carbon nanostructures including single-walled CNTs in the elastomer composition used to form the gas seal member is preferably 15 parts by mass or less, more preferably 13.5 parts by mass or less, even more preferably 12 parts by mass or less, and particularly preferably 10.5 parts by mass or less, per 100 parts by mass of the elastomer. If the amount of the fibrous carbon nanostructures including single-walled CNTs exceeds 15 parts by mass per 100 parts by mass of the elastomer, the hydrogen that penetrated through the gas seal member formed using the elastomer composition is less likely to escape from the gas seal member upon, for example, rapid decompression, so that the occurrence of blister destruction may not be sufficiently reduced.

It is preferred that the fibrous carbon nanostructures exhibit a convex upward shape in a t-plot obtained from an adsorption isotherm. The use of such fibrous carbon nanostructures exhibiting a convex upward shape in a t-plot obtained from an adsorption isotherm allows the formation of a gas seal member with further reduced occurrence of blister destruction.

It is more preferred that the fibrous carbon nanostructures have not undergone CNT opening treatment and exhibit a convex upward shape in a t-plot.

Adsorption generally refers to a phenomenon in which gas molecules are taken away from the gas phase to a solid surface, and is classified as physical or chemical adsorption depending on the cause of adsorption. The nitrogen gas adsorption method used to acquire a t-plot utilizes physical adsorption. In general, when adsorption temperature is constant, the number of nitrogen gas molecules adsorbed to fibrous carbon nanostructures increases with increasing pressure. A plot of the adsorbed amount of nitrogen versus relative pressure (ratio of pressure P at adsorption equilibrium to saturated vapor pressure P0) refers to an "isotherm." An isotherm obtained when the adsorbed amount of nitrogen gas is measured while increasing pressure refers to an "adsorption isotherm" and an isotherm obtained when the adsorbed amount of nitrogen gas is measured while decreasing pressure refers to a "desorption isotherm."

A t-plot is obtained by converting relative pressure to average adsorbed nitrogen gas layer thickness t (nm) in an adsorption isotherm measured by the nitrogen gas adsorption method. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

The growth of an adsorbed layer of nitrogen gas for a sample having pores at the surface is divided into the following processes (1) to (3). The gradient of the t-plot changes according to following processes (1) to (3):

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

It is preferred that the t-plot for the fibrous carbon nanostructures shows a straight line crossing the origin in a region in which the average adsorbed nitrogen gas layer thickness t is small and deviates downward from the straight line as t increases to have a convex upward shape. Such a t-plot shape indicates that the ratio of internal specific surface area to total specific surface area of the fibrous carbon nanostructures is large, indicating the presence of a large number of openings formed in the carbon nanostructures that constitute the fibrous carbon nanostructures. It is deduced that, as a result of a large number of such openings being formed in the fibrous carbon nanostructures, the gas penetrated through the fibrous carbon nanostructures easily migrates and escapes to the outside (i.e., a gas seal member that comprises the fibrous carbon nanostructures is less likely to experience blister destruction).

It is preferred that the t-plot for the fibrous carbon nanostructures has a bending point in a range of $0.2 \leq t$ (nm)$\leq 1.5$, more preferably in a range of $0.45 \leq t$ (nm)$\leq 1.5$, and even more preferably in a range of $0.55 \leq t$ (nm)$\leq 1.0$. When the position of the bending point of the t-plot falls within the range described above, the properties of the fibrous carbon nanostructures further improve, so that the occurrence of blister destruction can be further reduced.

The "position of the bending point" is an intersection point of an approximate straight line A for process (1) and an approximate straight line B for process (3) in the t-plot.

It is further preferred that the fibrous carbon nanostructures have a ratio of internal specific surface area $S2$ to total specific surface area $S1$ ($S2/S1$), obtained from a t-plot, of 0.05 or more, more preferably 0.06 or more, and even more preferably 0.08 or more, but preferably 0.30 or less. When the value of $S2/S1$ is 0.05 or more and 0.30 or less, the properties of the fibrous carbon nanostructures further improve, so that the occurrence of blister destruction can be further reduced.

The fibrous carbon nanostructures can have any total specific surface area S1 and any internal specific surface area S2. However, S1 is preferably 600 m²/g or more and 1,400 m²/g or less, and more preferably 800 m²/g or more and 1,200 m²/g or less. On the other hand, S2 is preferably 30 m²/g or more and 540 m²/g or less.

Total specific surface area S1 and internal specific surface area S2 of the fibrous carbon nanostructures can be found from the t-plot. Specifically, first, total specific surface area S1 can be found from the gradient of an approximate straight line corresponding to process (1) and external specific surface area S3 can be found from the gradient of an approximate straight line corresponding to process (3). Internal specific surface area S2 can then be calculated by subtracting external specific surface area S3 from total specific surface area S1.

Measurement of adsorption isotherm, preparation of a t-plot, and calculation of total specific surface area S1 and internal specific surface area S2 based on t-plot analysis for fibrous carbon nanostructures can be made using for example BELSORP®-mini (BELSORP is a registered trademark in Japan, other countries, or both), a commercially available measurement instrument available from Bel Japan Inc.

The fibrous carbon nanostructures are preferably those having a ratio of a standard deviation ($\sigma$) of diameters multiplied by 3 ($3\sigma$) to average diameter (Av) ($3\sigma/Av$) of greater than 0.20 and less than 0.60, more preferably those having $3\sigma/Av$ of greater than 0.25, even more preferably those having $3\sigma/Av$ of greater than 0.40, and particularly preferably those having $3\sigma/Av$ of greater than 0.50. The use of fibrous carbon nanostructures having $3\sigma/Av$ of greater than 0.20 and less than 0.60 allows the formation of a gas seal member with further reduced occurrence of swelling destruction and blister destruction.

"Average diameter (Av) of fibrous carbon nanostructures" and "standard deviation ($\sigma$) (where $\sigma$ is sample standard deviation) of diameters of fibrous carbon nanostructures" can each be obtained by measuring the diameters (outer diameters) of 100 fibrous carbon nanostructures randomly selected by transmission electron microscopy. The average diameter (Av) and standard deviation ($\sigma$) of the fibrous carbon nanostructures may be adjusted either by changing the production method and/or the production conditions of the fibrous carbon nanostructures or by combining different types of fibrous carbon nanostructures prepared by different production methods.

The fibrous carbon nanostructures preferably have an average diameter (Av) of 2 nm or more, and more preferably 2.5 nm or more, but preferably 60 nm or less, and more preferably 10 nm or less. When the average diameter (Av) of the fibrous carbon nanostructures is 2 nm or more, the fibrous carbon nanostructures are well dispersed within a cross-linked product without being aggregated resulting in a sufficient reinforcing effect. When the average diameter (Av) of the fibrous carbon nanostructures is 60 nm or less, passage of hydrogen through the cross-linked product is not inhibited, so that a decrease in the hydrogen diffusion coefficient can be prevented.

The fibrous carbon nanostructures preferably have an average length at the time of synthesis of 100 μm or more. Fibrous carbon nanostructures having a longer length at the time of synthesis are more susceptible to damage such as breaking, severing or the like during dispersing. Therefore, the average length of the nanostructures at the time of synthesis is preferably 5,000 μm or less.

The fibrous carbon nanostructures preferably have an aspect ratio (length/diameter) of greater than 10. The aspect ratio of the fibrous carbon nanostructures can be found by measuring diameters and lengths of 100 fibrous carbon nanostructures randomly selected by transmission electron microscopy and calculating the average of ratios of length to diameter (length/diameter).

The fibrous carbon nanostructures preferably have a BET specific surface area of 600 m²/g or more, and more preferably 800 m²/g or more, but preferably 2,500 m²/g or less, and more preferably 1,200 m²/g or less. When the BET specific surface area of the fibrous carbon nanostructures is 600 m²/g or more, it is possible to enhance the strength of the gas seal member formed using the elastomer composition, so that the occurrence of swelling destruction can be further reduced. When the BET specific surface area of the fibrous carbon nanostructures is 2,500 m²/g or less, it is possible to form a gas seal member with further reduced occurrence of blister destruction by reducing the amount of gas penetrating through the fibrous carbon nanotubes from their surface. In addition, it is possible to allow the fibrous carbon nanostructures to be well dispersed within the cross-linked product without being aggregated resulting in a sufficient reinforcing effect.

The term "BET specific surface area" as used herein refers to a nitrogen adsorption specific surface area measured by the BET method.

In accordance with the super growth method described later, the fibrous carbon nanostructures are obtained, on a substrate having thereon a catalyst layer for carbon nanotube growth, in the form of an aggregate wherein fibrous carbon nanostructures are aligned substantially perpendicularly to the substrate (aligned aggregate). The mass density of the fibrous carbon nanostructures in the form of such an aggregate is preferably 0.002 g/cm³ or more and 0.2 g/cm³ or less. A mass density of 0.2 g/cm³ or less allows the fibrous carbon nanostructures to be homogeneously dispersed within the elastomer because binding among the fibrous carbon nanostructures is weakened. A mass density of 0.002 g/cm³ or more improves the unity of the fibrous carbon nanostructures thus preventing the fibrous carbon nanostructures from becoming unbound and making the fibrous carbon nanostructures easier to handle.

The fibrous carbon nanostructures having the properties described above can be efficiently produced for example by forming a catalyst layer on a substrate surface by wet process in the super growth method (see WO2006/011655) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes obtained by the super growth method may also be referred to as "SGCNTs."

The fibrous carbon nanostructures produced by the super growth method may be composed solely of SGCNTs or may be composed of SGCNTs and non-cylindrical carbon nanostructures. Specifically, the fibrous carbon nanostructures may include single- or multi-walled flattened cylindrical carbon nanostructures having over the entire length a tape portion where inner walls are in close proximity to each other or bonded together (hereinafter such carbon nanostructures may be also referred to as "graphene nanotapes (GNTs)").

<Additives>

Additives which can be optionally included in the elastomer composition used to form the gas seal member are not particularly limited. Examples of usable additives include those known in the art, such as reinforcing materials, cross-linking agents, co-agents, and antioxidants.

Specifically, reinforcing materials are not particularly limited and, for example, silica and carbon black can be used, with silica being preferred. The combined use of the fibrous carbon nanostructures and silica allows the strength of the resulting gas seal member to be improved without significantly decreasing the hydrogen diffusion coefficient D2. The amount of silica in the elastomer composition is preferably 50 parts by mass or less, and more preferably 10 parts by mass or more and 30 parts by mass or less, per 100 parts by mass of the elastomer. When the amount of silica exceeds 50 parts by mass per 100 parts by mass of the elastomer, the hydrogen diffusion coefficient ratio D2/D1 may not be maintained at greater than 0.7, resulting in failure to sufficiently reduce the occurrence of blister destruction. When carbon black is added to the elastomer composition to an extent that the strength of the gas seal member improves, the hydrogen diffusion coefficient ratio D2/D1 becomes 0.7 or less. Thus, when adding carbon black to the elastomer composition, it is preferred that only a small amount (e.g., 10 parts by pass or less per 100 parts by mass of elastomer) is added. More preferably, the elastomer composition is free from carbon black.

Cross-linking agents are not particularly limited and any known cross-linking agents can be used which are capable of cross-linking the elastomer component included in the elastomer composition. More specifically, for example, sulfur, peroxide cross-linking agents (e.g., 1,3-bis(t-butylperoxyisopropyl)benzene), and triallyl isocyanurate can be used.

Co-agents are not particularly limited and, for example, zinc white can be used.

Antioxidants are not particularly limited, and amine antioxidants (e.g., 4,4'-bis (a,a-dimethylbenzyl)diphenylamine) and imidazole antioxidants (e.g., zinc salt of 2-mercaptobenzimidazole) can be used.

These additives may be used singly or in combination. Further, the additives may be added in any suitable amounts so long as the desired effect is not compromised.

<Preparation of Elastomer Composition>

The elastomer composition used to form the gas seal member can be prepared for example by mixing or kneading the elastomer, fibrous carbon nanostructures, and optional additives at desired blending ratios.

Specifically, the elastomer composition can be prepared by any method, e.g., by obtaining a mixture (masterbatch) of the elastomer and fibrous carbon nanostructures, and then kneading the mixture (masterbatch) with optional additives.

Preparation of the mixture (masterbatch) of the elastomer and fibrous carbon nanostructures can be carried out using any mixing method that allows the fibrous carbon nanostructures to be dispersed within the elastomer. Specifically, the mixture (masterbatch) can be prepared by any preparation method, e.g., by (i) adding the fibrous carbon nanostructures into an elastomer solution obtained by dissolving the elastomer in an organic solvent or into an elastomer dispersion obtained by dispersing the elastomer in a dispersion medium, further dispersing the fibrous carbon nanostructures using an ultrasonic homogenizer, a wet jet mill or other device to prepare a slurry, and removing the organic solvent or dispersion medium from the dispersed slurry; or (ii) adding the fibrous carbon nanostructures into an elastomer solution obtained by dissolving the elastomer in an organic solvent or into an elastomer dispersion obtained by dispersing the elastomer in a dispersion medium, further dispersing the fibrous carbon nanostructures using an ultrasonic homogenizer, a wet jet mill or other device to prepare a slurry, removing the organic solvent or dispersion medium from the dispersed slurry, and performing one or more times a kneading operation wherein an additional elastomer is added to the mixture of the elastomer and fibrous carbon nanostructures followed by kneading. Removal of the solvent or dispersion medium can be effected for example by coagulation, casting, or drying.

More specifically, obtaining a mixture (masterbatch) of the elastomer and fibrous carbon nanostructures may be effected either by (i) a method wherein all portions of the elastomer to be included in the final elastomer composition and the fibrous carbon nanostructures are mixed at once, and then the organic solvent or dispersion medium is removed, or (ii) a method wherein some portions of the elastomer to be included in the final elastomer composition and the fibrous carbon nanostructures are mixed, the organic solvent or dispersion medium is removed, and then a kneading operation wherein the remaining portions of the elastomer are further added to the mixture followed by kneading is performed one or more times.

Kneading can be effected using for example a mixer, a single screw kneader, a twin screw kneader, a roll, a Brabender, or an extruder.

Shaping/cross-linking conditions are not particularly limited. However, shaping and cross-linking are preferably effected under the following condition: temperature=140° C. to 250° C.; pressure=1 MPa to 20 MPa; time=1 minute to 180 minutes.

(High-Pressure Hydrogen Device)

The high-pressure hydrogen device of the present disclosure comprises a container filled with high-pressure hydrogen, and the gas seal member of the present disclosure. The gas seal member is in contact with the high-pressure hydrogen in the container.

Specific examples of such a high-pressure hydrogen device include devices used for hydrogen stations, such as a hydrogen production device (e.g., a hydrogen production device 111 in FIG. 1 described later), a hydrogen gas compressor (e.g., a hydrogen gas compressor (booster) 112 in FIG. 1 described later), a gas accumulator (e.g., a gas accumulator (pressure accumulator) 113 in FIG. 1 described later), a dispenser (e.g., a dispenser 114 in FIG. 1 described later), and a fuel cell mounted on a vehicle (e.g., a vehicle (fuel cell vehicle) 120 in FIG. 1 described later).

Figure 1:
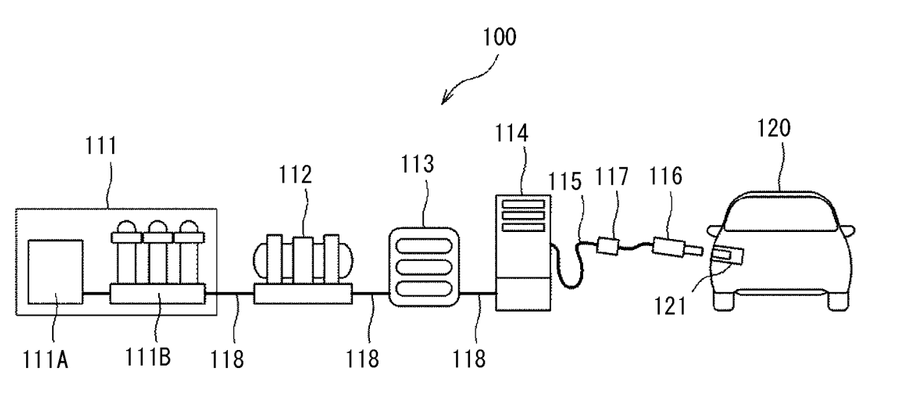
FIG. 1 is a schematic view of a configuration of a hydrogen station.

FIG. 1 is a schematic view of a configuration of a hydrogen station.

In FIG. 1, a hydrogen station 100 comprises a hydrogen production device 111, a hydrogen gas compressor (booster) 112, a gas accumulator (pressure accumulator) 113, and a dispenser 114. Each device is connected with a hydrogen pipe 118. In addition, piping devices (not illustrated) such as valves and joints are disposed as needed in the middle of each hydrogen pipe 118.

At the on-site type hydrogen station 100, a fuel (naphtha or kerosene) is supplied from the outside, and using this fuel, hydrogen is produced in the hydrogen production device 111 which comprises a fuel reformer 111A and a hydrogen purifier 111B for high purification of hydrogen.

By the hydrogen gas compressor (booster) 112, the hydrogen produced in the hydrogen production device 111 is converted into high-pressure hydrogen having a predetermined temperature (e.g., −20° C. to 180° C.) and a predetermined pressure (e.g., 95 MPa). The pressurized hydrogen is supplied to the vehicle (fuel cell vehicle) 120 equipped with a hydrogen tank (not illustrated) via the gas accumulator (pressure accumulator) 113 for temporary storage of high-pressure hydrogen and via the dispenser 114 for supplying the high-pressure hydrogen stored in the gas accumulator (pressure accumulator) 113 to the vehicle (fuel cell vehicle) 120.

At this time, supply of hydrogen from the dispenser 114 to the vehicle (fuel cell vehicle) 120 is achieved by the pressure difference of hydrogen. For example, the temperature and pressure in the gas accumulator (pressure accumulator) 113 are set to −20° C. to 50° C. and 95 MPa, respectively, and the temperature and pressure at the dispenser 114 are set to −40° C. to 50° C. and 82 MPa, respectively, whereby hydrogen fills a hydrogen tank disposed within the vehicle (fuel cell vehicle) 120 by the pressure difference.

The dispenser 114 comprises a hydrogen supply hose 115 for supplying hydrogen to the hydrogen tank of the vehicle (fuel cell vehicle) 120. A hydrogen supply plug 116 to be detachably connected to a receptacle 121 of the vehicle 120 is attached to the hydrogen supply hose 115. Thus, by connecting the hydrogen supply plug 116 to the receptacle 121, hydrogen can be supplied to the vehicle (fuel cell vehicle) 120.

An emergency release coupling 117 is disposed in the middle of the hydrogen supply hose 115. Thus, in the case of an emergency (e.g., when the vehicle (fuel cell vehicle) 120 has erroneously started), the emergency release coupling 117 is operated to stop the supply of hydrogen from the hydrogen station 100 side to the vehicle (fuel cell vehicle) 120 side.

The gas seal member of the present disclosure is disposed at a part connecting each device (hydrogen production device 111, hydrogen gas compressor (booster) 112, gas accumulator (pressure accumulator) 113, or dispenser 114) with the hydrogen pipe 118; between a container body and a lid in each device (hydrogen production device 111, hydrogen gas compressor (booster) 112, gas accumulator (pressure accumulator) 113, or dispenser 114); and so forth.

EXAMPLES

The following provides a more specific description of the present disclosure based on Examples, which however shall not be construed as limiting. In the following description, "%" and "parts" used to express quantities are by mass, unless otherwise specified.

In Examples and Comparative Examples, the tensile strength, elongation at break, diffusion coefficient, dissolved hydrogen amount, and volume swelling degree of cross-linked products were measured or evaluated using the methods described below.

<Tensile Strength>

A sheet-shaped cross-linked product prepared was punched out in dumbbell shape to afford a specimen. The tensile strength at 23° C. of the specimen was measured in accordance with JIS K6251. The higher the tensile strength, the less it is likely that blister destruction and swelling destruction take place.

<Elongation at Break>

A sheet-shaped cross-linked product prepared was punched out in dumbbell shape to prepare a specimen. The elongation at break at 23° C. of the specimen was measured in accordance with JIS K6251.

<Diffusion Coefficient>

A sheet-shaped cross-linked product prepared was exposed to hydrogen at 90 MPa for 24 hours. Changes in released hydrogen amount with time were then measured for the hydrogen-exposed specimen by gas chromatography using a temperature programmed desorption gas analyzer having a temperature of 30° C. The obtained hydrogen release profile was approximated by the following equation with the amount of saturated hydrogen and the diffusion coefficient as unknown constants, a diffusion coefficient was measured, and the value of diffusion coefficient (index) was indexed on the basis of the diffusion coefficient of Comparative Example 1, 3 or 5 (cross-linked product of an elastomer component containing neither fibrous carbon nanostructures nor carbon black). Specifically, (i) the diffusion coefficients of Example 1, Example 2 and Comparative Example 2 shown in Table 1 are expressed as values (indices) when the diffusion coefficient of Comparative Example 1 is expressed as 100; (ii) the diffusion coefficients of Example 3, Example 4 and Comparative Example 4 shown in Table 2 are expressed as values (indices) when the diffusion coefficient of Comparative Example 3 is expressed as 100; and (iii) the diffusion coefficients of Example 5, Example 6 and Comparative Example 6 shown in Table 3 are expressed as values (indices) when the diffusion coefficient of Comparative Example 5 is expressed as 100. The higher the diffusion coefficient (index), the less it is likely that blister destruction takes place.

$$C_{H,R}(t) = \frac{32}{\pi^2} \times C_{H0} \times \left\{ \sum_{n=0}^{\infty} \frac{\exp[-(2n+1)^2 \pi^2 Dt / l^2]}{(2n+1)^2} \right\} \times \left\{ \sum_{n=1}^{\infty} \frac{\exp[-D\beta_n^2 t / \rho^2]}{\beta_n^2} \right\}$$

t: elapsed time after decompression
$C_{H,R}(t)$: residual hydrogen amount at time t
$C_{H0}$: equilibrium hydrogen amount
D: diffusion coefficient
ρ: radius of columnar specimen after hydrogen exposure
l: thickness of columnar specimen after hydrogen exposure
$β_n$: root of 0th Bessel function <Dissolved Hydrogen Amount>

A sheet-shaped cross-linked product prepared was exposed to hydrogen at 90 MPa for 24 hours. Changes in released hydrogen amount with time were then measured for the hydrogen-exposed specimen by gas chromatography using a temperature programmed desorption gas analyzer having a temperature of 30° C. The obtained hydrogen release profile was approximated by the following equation with the amount of saturated hydrogen and the diffusion coefficient as unknown constants, and the hydrogen amount at t=0 was extrapolated to measure the dissolved hydrogen amount. The smaller the dissolved hydrogen amount, the less it is likely that blister destruction takes place.

$$C_{H,R}(t) = \frac{32}{\pi^2} \times C_{H0} \times \left\{ \sum_{n=0}^{\infty} \frac{\exp[-(2n+1)^2 \pi^2 Dt / l^2]}{(2n+1)^2} \right\} \times \left\{ \sum_{n=1}^{\infty} \frac{\exp[-D\beta_n^2 t / \rho^2]}{\beta_n^2} \right\}$$

t: elapsed time after decompression
$C_{H,R}(t)$: residual hydrogen amount at time t
$C_{H0}$: equilibrium hydrogen amount
D: diffusion coefficient
ρ: radius of columnar specimen after hydrogen exposure
l: thickness of columnar specimen after hydrogen exposure
$β_n$: root of 0th Bessel function <Volume Swelling Degree>

Using a full-area measurement two-dimensional multi-point size meter ("TM-3000" manufactured by Keyence Corporation) adjusted to have a temperature of 30° C., the area of a two-dimensional silhouette image of a sheet-shaped cross-linked product prepared was measured and a square root of the measured area was cubed to calculate the volume V0 of the specimen prior to hydrogen exposure test. After hydrogen exposure at 90 MPa for 24 hours, using the full-area measurement two-dimensional multi-point size meter ("TM-3000" manufactured by Keyence Corporation) adjusted to have a temperature of 30° C., the volume V of the hydrogen-exposed specimen was calculated from the area of a two-dimensional silhouette image. The volume swelling degree V/V0 was then obtained by dividing V by V0. The lower the volume swelling degree, the less it is likely that swelling destruction takes place.

Example 1

<Preparation of Fibrous Carbon Nanostructures Including Single-Walled Carbon Nanotubes>

In accordance with the teaching of WO2006/011655A, the super growth method was used to prepare carbon nanotubes (SGCNTs) as the fibrous carbon nanostructures. Upon preparation of SGCNTs, formation of a catalyst layer on a substrate surface was carried out by the wet process and a source gas containing acetylene as a main component was used.

The obtained SGCNTs consisted primarily of single-walled CNTs, with the radial breathing mode (RBM) being observed in a low wavenumber range of 100 to 300 $cm^{-1}$ in a spectrum measured by a Raman spectrophotometer, which is characteristic of single-walled CNTs. The BET specific surface area of the SGCNTs as measured using a BET specific surface area meter ("BELSORP-max" manufactured by Bel Japan Inc.) was 1,050 $m^2/g$ (unopened). The diameters and lengths of 100 SGCNTs randomly selected using a transmission electron microscope were measured to find the average diameter (Av), the standard deviation (σ) of the diameters and the average length for the SGCNTs. The average diameter (Av) was 3.3 nm, the standard deviation (σ) multiplied by 3 (3σ) was 1.9 nm, the ratio of 3σ to Av (3σ/Av) was 0.58, and the average length was 500 μm. A t-plot of the SGCNTs measured using "BELSORP-mini" manufactured by Bel Japan Inc. was bent having a convex upward shape. The value of S2/S1 was 0.09 and the position t of the bending point was 0.6 nm.

<Preparation of Elastomer Composition>

[Preparation of Mixture (Primary Masterbatch)]

To 760 g of methyl ethyl ketone as an organic solvent was added 40 g of nitrile rubber ("Nipol 1024", acrylonitrile butadiene rubber, manufactured by ZEON Corporation) as an elastomer and stirred for 24 hours to dissolve the acrylonitrile butadiene rubber. The Moony viscosity ($ML_{1+4}$, 100° C.) of the acrylonitrile butadiene rubber as measured in accordance with JIS K6300 was 77.5.

Next, 8 g of the SGCNTs was added to the obtained acrylonitrile butadiene rubber solution and stirred for 10 minutes using a stirrer (LABOLUTION® (LABOLUTION is a registered trademark in Japan, other countries, or both) manufactured by PRIMIX Corporation). Further, using a wet jet mill (L-ES007, manufactured by Yoshida Kikai Co., Ltd.), the solution containing the SGCNTs was subjected to dispersing treatment at 100 MPa. The dispersed solution was then added dropwise to 3,200 g of cyclohexane for solidification to afford a black solid. The black solid was dried under reduced pressure at 60° C. for 12 hours to afford a mixture (primary masterbatch) of acrylonitrile butadiene rubber and SGCNTs.

[Kneading]

Thereafter, using an open roll having a temperature of 50° C., 48 g of the mixture (primary masterbatch) of 40 g acrylonitrile butadiene rubber and 8 g SGCNTs was kneaded with 30 g of acrylonitrile butadiene rubber for 10 minutes to produce a secondary masterbatch.

Using the open roll having a temperature of 50° C., 78 g of the mixture (secondary masterbatch) of 70 g acrylonitrile butadiene rubber and 8 g SGCNTs was further kneaded with 30 g of acrylonitrile butadiene rubber for 10 minutes to produce a tertiary masterbatch.

The mixture (tertiary masterbatch) of 100 g acrylonitrile butadiene rubber and 8 g SGCNTs, 1.5 g of 4,4'-bis(a,a-dimethylbenzyl)diphenylamine ("NOCRAC CD", manufactured by Ouchi Shinko Chemical Industrial Co., Ltd.) and 1.5 g of zinc salt of 2-mercaptobenzimidazole ("NOCRAC MBZ", manufactured by Ouchi Shinko Chemical Industrial Co., Ltd.) as antioxidants, and 8 g of 1,3-bis(t-butylperoxy-isopropyl)benzene ("Vul Cup 40KE", manufactured by GEO Specialty Chemicals Inc.) as a cross-linking agent were kneaded together to afford an elastomer composition.

<Preparation of Sheet-Shaped Cross-Linked Product>

The elastomer composition prepared was placed into a mold and cross-linked at a temperature of 160° C. and a pressure of 10 MPa for 10 minutes to afford a sheet-shaped cross-linked product (length: 150 mm, width: 150 mm, thickness: 2 mm).

The sheet-shaped cross-linked product prepared was measured for tensile strength, elongation at break, diffusion coefficient, dissolved hydrogen amount, and volume swelling degree. The results are shown in Table 1.

Example 2

An elastomer composition and a sheet-shaped cross-linked product were prepared as in Example 1 except that when preparing the mixture, 8 g of the SGCNTs added to the acrylonitrile butadiene rubber solution was changed to 30 g of multi-walled CNTs or MWCNTs ("NC 7000", manufactured by Nanocyl S. A., BET specific surface area: 290 $m^2/g$) as fibrous carbon nanostructures which do not include single-walled CNTs. Evaluations were made as in Example 1. The results are shown in Table 1.

Comparative Example 1

A sheet-shaped cross-linked product (cross-linked product of elastomer component) was produced as in Example 1 except that preparation of the elastomer composition was performed in the manner as described below. Evaluations were made as in Example 1. The results are shown in Table 1.

<Preparation of Elastomer Composition>

100 g of acrylonitrile butadiene rubber ("Nipol 1024", manufactured by ZEON Corporation,) was masticated using a Banbury mixer of 250 ml volume, and 1.5 g of 4,4'-bis(a,a-dimethylbenzyl)diphenylamine ("NOCRAC CD", manufactured by Ouchi Shinko Chemical Industrial Co., Ltd.) and 1.5 g of zinc salt of 2-mercaptobenzimidazole ("NOCRAC MBZ", manufactured by Ouchi Shinko Chemical Industrial Co., Ltd.) as antioxidants were added and mixed for 3.5 minutes at a start temperature of 80° C. The mixture prepared was transferred to a roll and 8 g of 1,3-bis(t-butylperoxyisopropyl)benzene ("Vul Cup 40KE", manufactured by GEO Specialty Chemicals Inc.) as a cross-linking agent was added and kneaded at a temperature of 50° C. to afford an elastomer composition.

Comparative Example 2

A sheet-shaped cross-linked product was produced as in Example 1 except that preparation of the elastomer composition was performed in the manner as described below. Evaluations were made as in Example 1. The results are shown in Table 1.
<Preparation of Elastomer Composition>
100 g of acrylonitrile butadiene rubber ("Nipol 1024", manufactured by ZEON Corporation,) was masticated using a Banbury mixer of 250 ml volume. Next, 50 g of carbon black ("Seast SO", manufactured by Tokai Carbon Co., Ltd., BET specific surface area: 42 $m^2/g$), and 1.5 g of 4,4'-bis (a,a-dimethylbenzyl)diphenylamine ("NOCRAC CD", manufactured by Ouchi Shinko Chemical Industrial Co., Ltd.) and 1.5 g of zinc salt of 2-mercaptobenzimidazole ("NOCRAC MBZ", manufactured by Ouchi Shinko Chemical Industrial Co., Ltd.) as antioxidants were added to the acrylonitrile butadiene rubber and mixed for 3.5 minutes at a start temperature of 80° C. The mixture prepared was transferred to a roll and 8 g of 1,3-bis(t-butylperoxyisopropyl)benzene ("Vul Cup 40KE", manufactured by GEO Specialty Chemicals Inc.) as a cross-linking agent was added and kneaded at a temperature of 50° C. to afford an elastomer composition.

Example 3

An elastomer composition and a sheet-shaped cross-linked product were prepared as in Example 1 except that when preparing the mixture, hydrogenated nitrile rubber ("Zetpol 2020L", manufactured by ZEON Corporation) was used instead of acrylonitrile butadiene rubber as elastomer, and that the amount of the added SGCNTs was changed to 10 g.
The Moony viscosity ($ML_{1+10}$, 121° C.) of the hydrogenated nitrile rubber as measured in accordance with JIS K6300 was 57.5.

Example 4

An elastomer composition and a sheet-shaped cross-linked product were prepared as in Example 2 except that when preparing the mixture, hydrogenated nitrile rubber ("Zetpol 2020L", manufactured by ZEON Corporation) was used instead of acrylonitrile butadiene rubber as elastomer. Evaluations were made as in Example 2. The results are shown in Table 2.

Comparative Example 3

An elastomer composition and a sheet-shaped cross-linked product (cross-linked product of elastomer component) were prepared as in Comparative Example 1 except that when preparing the elastomer composition, hydrogenated nitrile rubber ("Zetpol 2020L", manufactured by ZEON Corporation) was used instead of acrylonitrile butadiene rubber as elastomer. Evaluations were made as in Comparative Example 1. The results are shown in Table 2.

Comparative Example 4

An elastomer composition and a sheet-shaped cross-linked product were prepared as in Comparative Example 2 except that when preparing the elastomer composition, hydrogenated nitrile rubber ("Zetpol 2020L", manufactured by ZEON Corporation) was used instead of acrylonitrile butadiene rubber as elastomer, and that the amount of added carbon black was changed to 80 g. Evaluations were made as in Comparative Example 2. The results are shown in Table 2.

Example 5

Evaluations were performed as in Example 1 except that preparation of an elastomer composition and preparation of a sheet-shaped crosslinked product were performed in the manner as described below. The results are shown in Table 3.
<Preparation of Elastomer Composition>
[Preparation of Mixture (Primary Masterbatch)]
To 760 g of methyl ethyl ketone as an organic solvent was added 40 g of fluororubber ("Viton® GBL 600S" (Viton is a registered trademark in Japan, other countries, or both), manufactured by DuPont Co., Ltd.) as elastomer, and stirred for 24 hours to dissolve the fluororubber. The Moony viscosity ($ML_{1+4}$, 100° C.) of the fluororubber as measured in accordance with JIS K6300 was 65.
Next, 4 g of the SGCNTs was added to the prepared fluororubber solution and stirred for 10 minutes using a stirrer (LABOLUTION® (LABOLUTION is a registered trademark in Japan, other countries, or both) manufactured by PRIMIX Corporation). Further, using a wet jet mill (L-ES007, manufactured by Yoshida Kikai Co., Ltd.), the solution containing the SGCNTs was subjected to dispersing treatment at 100 MPa. The dispersed solution was then added dropwise to 3,200 g of methanol for solidification to afford a black solid. The black solid was dried under reduced pressure at 60° C. for 12 hours to afford a mixture of fluororubber and SGCNTs.
[Kneading]
Thereafter, using an open roll having a temperature of 50° C., 44 g of the mixture (primary masterbatch) of 40 g fluororubber and 4 g SGCNTs was kneaded with 30 g of fluororubber for 10 minutes to produce a secondary masterbatch.
Using the open roll having a temperature of 50° C., 74 g of the mixture (secondary masterbatch) of 70 g fluororubber and 4 g SGCNTs was further kneaded with 30 g of fluororubber for 10 minutes to produce a tertiary masterbatch.
The mixture (tertiary masterbatch) of 100 g fluororubber and 4 g SGCNTs, 3 g of zinc white as a co-agent, 2 g of 2,5-dimethyl-2,5-di(t-butylperoxy)hexane ("PERHEXA® 25B40", manufactured by NOR Corporation) as a cross-linking agent, and 3 g of triallyl isocyanurate ("TAIC", manufactured by Nihon Kasei Co., Ltd.) as a co-cross-linking agent were kneaded together to afford an elastomer composition.
<Preparation of Sheet-Shaped Cross-Linked Product>
The elastomer composition prepared was placed into a mold and cross-linked at a temperature of 170° C. and a pressure of 10 MPa for 20 minutes to afford a sheet-shaped primary cross-linked product (length: 150 mm, width: 150 mm, thickness: 2 mm), which was then subjected to secondary cross-linking at 230° C. for 2 hours in a gear oven to prepare a sheet-shaped cross-linked product.

Example 6

An elastomer composition and a sheet-shaped cross-linked product were prepared as in Example 5 except that when preparing the mixture, 4 g of the SGCNTs added to the fluororubber solution was changed to 30 g of multi-walled CNTs or MWCNTs ("NC 7000", manufactured by Nanocyl S. A., BET specific surface area: 290 m²/g) as fibrous carbon nanostructures which do not include single-walled CNTs. Evaluations were made as in Example 5. The results are shown in Table 3.

Comparative Example 5

An elastomer composition was prepared as in Comparative Example 1 except that when preparing the elastomer composition, fluororubber ("Viton® GBL 600S" (Viton is a registered trademark in Japan, other countries, or both), manufactured by DuPont Co., Ltd.) was used instead of acrylonitrile butadiene rubber as elastomer, and that 3 g of zinc white as a co-agent, 2 g of 2,5-dimethyl-2,5-di(t-butylperoxy)hexane ("PERHEXA® 25B40", manufactured by NOR Corporation) as a cross-linking agent, and 3 g of triallyl isocyanurate ("TAIC", manufactured by Nihon Kasei Co., Ltd.) as a co-cross-linking agent were used instead of 8 g of 1,3-bis(t-butylperoxyisopropyl)benzene ("Vul Cup 40KE", manufactured by GEO Specialty Chemicals Inc.) as a cross-linking agent and a co-agent. Preparation of a sheet-shaped cross-linked product (cross-linked product of elastomer component) was performed in the manner described below. Evaluations were made as in Comparative Example 1. The results are shown in Table 3.

<Preparation of Sheet-Shaped Cross-Linked Product (Cross-Linked Product of Elastomer Component)>

The elastomer composition prepared was placed into a mold and cross-linked at a temperature of 170° C. and a pressure of 10 MPa for 20 minutes to afford a sheet-shaped primary cross-linked product (length: 150 mm, width: 150 mm, thickness: 2 mm), which was then subjected to secondary cross-linking at 230° C. for 2 hours in a gear oven to prepare a sheet-shaped cross-linked product.

Comparative Example 6

An elastomer composition was prepared as in Comparative Example 2 except that when preparing the elastomer composition, fluororubber ("Viton® GBL 600S" (Viton is a registered trademark in Japan, other countries, or both), manufactured by DuPont Co., Ltd.) was used instead of acrylonitrile butadiene rubber as elastomer, that 3 g of zinc white as a co-agent, 2 g of 2,5-dimethyl-2,5-di(t-butylperoxy)hexane ("PERHEXA® 25B40", manufactured by NOR Corporation) as a cross-linking agent, and 3 g of triallyl isocyanurate ("TAIC", manufactured by Nihon Kasei Co., Ltd.) as a co-cross-linking agent were used instead of 8 g of 1,3-bis(t-butylperoxyisopropyl)benzene ("Vul Cup 40KE", manufactured by GEO Specialty Chemicals Inc.) as a cross-linking agent and a co-agent, and that 60 g of MT carbon black ("Thermax MT", manufactured by Tokai Carbon Co., Ltd.,) was used instead of 50 g of carbon black ("Seast SO", manufactured by Tokai Carbon Co., Ltd., BET specific surface area: 42 m²/g) as carbon black. Preparation of a sheet-shaped cross-linked product was performed in the manner described below. Evaluations were made as in Comparative Example 2. The results are shown in Table 3.

<Preparation of Sheet-Shaped Cross-Linked Product>

The elastomer composition prepared was placed into a mold and cross-linked at a temperature of 170° C. and a pressure of 10 MPa for 20 minutes to afford a sheet-shaped primary cross-linked product (length: 150 mm, width: 150 mm, thickness: 2 mm), which was then subjected to secondary cross-linking at 230° C. for 2 hours in a gear oven to prepare a sheet-shaped cross-linked product.

TABLE 1

| | | | Unit | Ex. 1 | Ex. 2 | Comp. Ex. 1 | Comp. Ex. 2 |
|---|---|---|---|---|---|---|---|
| Elastomer composition | Elastomer | Nitrite rubber (Nipol 1042) | Parts by mass | 100 | 100 | 100 | 100 |
| | Fibrous carbon nanostructures | Single-walled carbon nanotubes (SGCNTs) | Parts by mass | 8 | — | — | — |
| | | Multi-walled carbon nanotubes (MWCNTs) | Parts by mass | — | 30 | — | — |
| | Carbon black | FEF carbon black (Seast SO) | Parts by mass | — | — | — | 50 |
| | Cross-linking agent/ Co-agent | Vul Cup 40KE | Parts by mass | 8 | 8 | 8 | 8 |
| | | Zinc white | Parts by mass | — | — | — | — |
| | | PERHEXA 25B40 | Parts by mass | — | — | — | — |
| | | TAIC | Parts by mass | — | — | — | — |
| | Antioxidant | NOCRAC CD | Parts by mass | 1.5 | 1.5 | 1.5 | 1.5 |
| | | NOCRAC MBZ | Parts by mass | 1.5 | 1.5 | 1.5 | 1.5 |
| Evaluation results | Physical properties | Tensile strength | MPa | 30 | 26 | 3 | 16 |
| | | Elongation at break | % | 172 | 194 | 420 | 270 |
| | Hydrogen characteristics | Diffusion coefficient (index) | — | 87 | 75 | 100 | 28 |
| | | D2/D1 | — | 0.87 | 0.75 | 1.00 | 0.28 |
| | | Dissolved hydrogen amount | wt · ppm | 1530 | 1870 | 1850 | 2450 |
| | | Volume swelling degree | — | 1.17 | 1.23 | 1.9 | 1.5 |

TABLE 2

|  |  |  | Unit | Ex. 3 | Ex. 4 | Comp. Ex. 3 | Comp. Ex. 4 |
|---|---|---|---|---|---|---|---|
| Elastomer composition | Elastomer | Hydrogenated nitrile rubber (Zetpol 2020L) | Parts by mass | 100 | 100 | 100 | 100 |
|  | Fibrous carbon nanostructures | Single-walled carbon nanotubes (SGCNTs) | Parts by mass | 10 | — | — | — |
|  |  | Multi-walled carbon nanotubes (MWCNTs) | Parts by mass | — | 30 | — | — |
|  | Carbon black | FEF carbon black (Seast SO) | Parts by mass | — | — | — | 80 |
|  | Cross-linking agent/ Co-agent | Vul Cup 40KE | Parts by mass | 8 | 8 | 8 | 8 |
|  |  | Zinc white | Parts by mass | — | — | — | — |
|  |  | PERHEXA 25B40 | Parts by mass | — | — | — | — |
|  |  | TAIC | Parts by mass | — | — | — | — |
|  | Antioxidant | NOCRAC CD | Parts by mass | 1.5 | 1.5 | 1.5 | 1.5 |
|  |  | NOCRAC MBZ | Parts by mass | 1.5 | 1.5 | 1.5 | 1.5 |
| Evaluation results | Physical properties | Tensile strength | MPa | 41 | 34 | 6 | 31 |
|  |  | Elongation at break | % | 128 | 237 | 358 | 159 |
|  | Hydrogen characteristics | Diffusion coefficient (index) | — | 85 | 80 | 100 | 20 |
|  |  | D2/D1 | — | 0.85 | 0.80 | 1.00 | 0.20 |
|  |  | Dissolved hydrogen amount | wt · ppm | 530 | 610 | 1766 | 2560 |
|  |  | Volume swelling degree | — | 1.01 | 1.03 | 1.70 | 1.26 |

TABLE 3

|  |  |  | Unit | Ex. 5 | Ex. 6 | Comp. Ex. 5 | Comp. Ex. 6 |
|---|---|---|---|---|---|---|---|
| Elastomer composition | Elastomer | Fluororubber (GBL 600S) | Parts by mass | 100 | 100 | 100 | 100 |
|  | Fibrous carbon nanostructures | Single-walled carbon nanotubes (SGCNTs) | Parts by mass | 4 | — | — | — |
|  |  | Multi-walled carbon nanotubes (MWCNTs) | Parts by mass | — | 30 | — | — |
|  | Carbon black | MT carbon black (Thermax MT) | Parts by mass | — | — | — | 60 |
|  | Cross-linking agent/ Co-agent | Vul Cup 40KE | Parts by mass | — | — | — | — |
|  |  | Zinc white | Parts by mass | 3 | 3 | 3 | 3 |
|  |  | PERHEXA 25B40 | Parts by mass | 2 | 2 | 2 | 2 |
|  |  | TAIC | Parts by mass | 3 | 3 | 3 | 3 |
|  | Antioxidant | NOCRAC CD | Parts by mass | — | — | — | — |
|  |  | NOCRAC MBZ | Parts by mass | — | — | — | — |
| Evaluation results | Physical properties | Tensile strength | MPa | 32 | 35 | 9 | 23 |
|  |  | Elongation at break | % | 125 | 159 | 347 | 191 |
|  | Hydrogen characteristics | Diffusion coefficient (index) | — | 90 | 83 | 100 | 30 |
|  |  | D2/D1 | — | 0.90 | 0.83 | 1.00 | 0.30 |
|  |  | Dissolved hydrogen amount | wt · ppm | 200 | 195 | 1397 | 370 |
|  |  | Volume swelling degree | — | 1.02 | 1.01 | 1.68 | 1.07 |

As seen from Tables 1 to 3, Examples 1 to 6 which satisfy the relationship 0.7<D2/D1<1.0 provided gas seal members with sufficiently reduced occurrence of both swelling destruction and blister destruction, compared to Comparative Examples 1 to 6 which do not satisfy the relationship 0.7<D2/D1<1.0.

The reduced occurrence of "swelling destruction" can be read from high tensile strength and low volume swelling degree, and the reduced occurrence of "blister destruction" can be read from high tensile strength, high diffusion coefficient, low volume swelling degree, and low dissolved hydrogen amount.

For example, in Comparative Example 1, swelling destruction cannot be reduced due to low tensile strength and high volume swelling degree, and blister destruction cannot be reduced due to low tensile strength. Comparative Example 1 appears to be a preferred embodiment with the dissolved hydrogen amount of 1,850, a value smaller than 1,870 in Example 2. However, due to lack of filler (CNTs or carbon black), Comparative Example 1 shows a low reinforcing ability and a volume swelling ratio of as high as 1.9. Thus, Comparative Example 1 cannot be a preferred embodiment.

Because carbon black adsorbs (dissolves) hydrogen, internal destruction is more likely to occur as more carbon black is added to the elastomer composition. This can also be evidenced from, for example, the fact that Comparative Example 2 in which carbon black was added to the elastomer composition showed high hydrogen solubility (2,000 to 2,500). It is deduced that irregularities on the surface of carbon of black adsorbed hydrogen.

On the other hand, because CNTs do not adsorb (dissolve) hydrogen and also have a low volume swelling degree, addition of CNTs into the elastomer composition allows the hydrogen solubility and the volume swelling degree to be maintained low.

For the combination of Example 1 and Example 2, the combination of Example 3 and Example 4, and the combination of Example 5 and Example 6, the amounts of single-walled CNTs and multi-walled CNTs were adjusted such that the cross-linked products of the elastomer compositions were comparable in their hardness.

INDUSTRIAL APPLICABILITY

According to the present disclosure, it is possible to provide a gas seal member for high-pressure hydrogen device with sufficiently reduced occurrence of both swelling destruction and blister destruction.

According to the present disclosure, it is also possible to provide a high-pressure hydrogen device in which the occurrence of swelling destruction and blister destruction of a gas seal member is sufficiently reduced.

REFERENCE SIGNS LIST

100 Hydrogen station
111 Hydrogen production device
111A Fuel Reformer
111B Hydrogen purifier
112 Hydrogen gas compressor (booster)
113 Gas accumulator (pressure accumulator)
114 Dispenser
115 Hydrogen supply hose
116 Hydrogen supply plug
117 Release coupling
118 Hydrogen pipe
120 Vehicle (fuel cell vehicle)
121 Receptacle

The invention claimed is:

1. A gas seal member for high-pressure hydrogen device which is formed of a cross-linked product of an elastomer composition, wherein
 the elastomer composition comprises an elastomer and fibrous carbon nanostructures,
 a hydrogen diffusion coefficient D1 of a cross-linked product of an elastomer component including the elastomer and a hydrogen diffusion coefficient D2 of the cross-linked product of the elastomer composition satisfy the relationship $0.7<D2/D1<1.0$, and
 the fibrous carbon nanostructures comprise single-walled carbon nanotubes.

2. The gas seal member for high-pressure hydrogen device according to claim 1, wherein the elastomer is nitrile rubber, hydrogenated nitrile rubber, or fluororubber.

3. The gas seal member for high-pressure hydrogen device according to claim 1, wherein the fibrous carbon nanostructures have an average diameter of 1 nm or more and 60 nm or less.

4. The gas seal member for high-pressure hydrogen device according to claim 1, wherein the elastomer composition comprises 3 parts by mass or more and 15 parts by mass or less of the fibrous carbon nanostructures comprising single-walled carbon nanotubes, per 100 parts by mass of the elastomer.

5. The gas seal member for high-pressure hydrogen device according to claim 1, wherein the gas seal member is configured to be used in a state of being in contact with high-pressure hydrogen of 35 MPa or more and 105 MPa or less.

6. The gas seal member for high-pressure hydrogen device according to claim 1, wherein the elastomer composition comprises silica, and the amount of silica in the elastomer composition is 50 parts by mass or less.

7. A high-pressure hydrogen device comprising:
 a container filled with high-pressure hydrogen of 35 MPa or more and 105 MPa or less; and
 the gas seal member for high-pressure hydrogen device according to claim 5 which is in contact with the high-pressure hydrogen in the container.

* * * * *